(12) United States Patent
Bruno et al.

(10) Patent No.: US 11,097,586 B2
(45) Date of Patent: Aug. 24, 2021

(54) DAMPER AND SPRING UNIT FOR A VEHICLE SUSPENSION PROVIDED WITH AN ELECTRO-MECHANICAL ADJUSTMENT DEVICE FOR ADJUSTING THE VERTICAL POSITION OF THE SPRING

(71) Applicant: MARELLI SUSPENSION SYSTEMS ITALY S.P.A., Corbetta (IT)

(72) Inventors: Walter Bruno, Asti (IT); Piero Antonio Conti, Asti (IT); Giordano Greco, Turin (IT); Nicola Amati, Alpignano (IT); Renato Galluzzi, San Benigno Canavese (IT); Sanjarbek Ruzimov, Pintak (UZ); Andrea Tonoli, Avigliana (IT)

(73) Assignee: MARELLI SUSPENSION SYSTEMS ITALY S.P.A., Corbetta (IT)

(*) Notice: Subject to any disclaimer, the term of this patent is extended or adjusted under 35 U.S.C. 154(b) by 0 days.

(21) Appl. No.: 16/764,519

(22) PCT Filed: Nov. 16, 2018

(86) PCT No.: PCT/IB2018/059025
§ 371 (c)(1),
(2) Date: May 15, 2020

(87) PCT Pub. No.: WO2019/097461
PCT Pub. Date: May 23, 2019

(65) Prior Publication Data
US 2020/0384822 A1 Dec. 10, 2020

(30) Foreign Application Priority Data
Nov. 17, 2017 (IT) .......................... 102017000131839

(51) Int. Cl.
*B60G 17/015* (2006.01)
*B60G 15/06* (2006.01)
*F16H 25/20* (2006.01)

(52) U.S. Cl.
CPC .......... *B60G 17/015* (2013.01); *B60G 15/063* (2013.01); *B60G 2202/312* (2013.01);
(Continued)

(58) Field of Classification Search
CPC .............. B60G 17/015; B60G 15/063; B60G 2202/312; B60G 2202/42; B60G 2500/30;
(Continued)

(56) References Cited

U.S. PATENT DOCUMENTS

| 7,922,181 B2 | 4/2011 | Hakui et al. |
| 8,205,864 B2 | 6/2012 | Michel |

(Continued)

FOREIGN PATENT DOCUMENTS

| DE | 102005026782 A1 | 12/2006 |
| DE | 102009038084 A1 | 2/2011 |
| DE | 102014220185 A1 | 4/2016 |
| EP | 2332756 A2 | 6/2011 |

OTHER PUBLICATIONS

International Search Report and Written Opinion of the International Searching Authority for PCT International Application No. PCT/IB2018/059025 dated Jan. 31, 2019.

*Primary Examiner* — Darlene P Condra
(74) *Attorney, Agent, or Firm* — Howard & Howard Attorneys PLLC

(57) ABSTRACT

A damper and spring unit includes a damper having a cylinder and a rod extending along a first axis (z), a spring plate arranged around the cylinder and slidable with respect to the cylinder along the first axis (z), a spring resting at its bottom on the spring plate, and an electro-mechanical adjustment device interposed between the cylinder and the (Continued)

spring plate for adjusting in a continuous and controlled manner the vertical position of the bottom end of the spring and the height of the vehicle from the ground. The adjustment device includes an electric motor generating a rotary motion and a motion conversion mechanism having one screw extending along a second axis (z') parallel to the first axis (z), but spaced therefrom, and driven into rotation by the electric motor about the second axis (z'), and a nut meshing with the screw and drivingly connected for translation with the spring plate.

3 Claims, 2 Drawing Sheets

(52) U.S. Cl.
 CPC ...... *B60G 2202/42* (2013.01); *B60G 2500/30* (2013.01); *F16H 25/20* (2013.01)

(58) Field of Classification Search
 CPC .. B60G 2204/419; B60G 17/021; F16H 25/20
 See application file for complete search history.

(56) References Cited

U.S. PATENT DOCUMENTS

| | | | |
|---|---|---|---|
| 8,516,914 | B2* | 8/2013 | Osterlanger ........... B62D 17/00 74/89.39 |
| 8,833,775 | B2 | 9/2014 | Kim et al. |
| 2017/0028805 | A1* | 2/2017 | Krehmer ................ B60G 11/16 |
| 2018/0297434 | A1* | 10/2018 | Ohno ..................... B60G 17/06 |
| 2019/0248203 | A1* | 8/2019 | Krehmer ............ B60G 17/0157 |
| 2020/0331316 | A1* | 10/2020 | Ohno ..................... B60G 17/06 |
| 2020/0370628 | A1* | 11/2020 | Sommerkorn ...... F16H 25/2204 |
| 2021/0048084 | A1* | 2/2021 | Murakami ................ F16F 9/56 |

* cited by examiner

DAMPER AND SPRING UNIT FOR A VEHICLE SUSPENSION PROVIDED WITH AN ELECTRO-MECHANICAL ADJUSTMENT DEVICE FOR ADJUSTING THE VERTICAL POSITION OF THE SPRING

CROSS-REFERENCE TO RELATED APPLICATIONS

The present application is a National Stage of International Patent Application No. PCT/IB2018/059025, filed Nov. 16, 2018, which claims priority to and all the benefits of Italian Patent Application No. 102017000131839, filed on Nov. 17, 2017, both of which are hereby expressly incorporated herein by reference in their entirety.

BACKGROUND OF THE INVENTION

1. Field of Invention

The present invention relates in general to a damper and spring unit for a vehicle suspension provided with an adjustment device for adjusting the vertical position of the spring, thereby adjusting the height of the vehicle from the ground.

2. Description of Related Art

In a vehicle suspension comprising a damper and spring unit, wherein the damper is connected at its bottom end to a wheel-carrying member or to a suspension arm and at its top end to the body of the vehicle and wherein the spring is arranged around the damper and rests at its bottom end against a spring plate and at its top end against the body of the vehicle, it is known to use an adjustment device interposed between the cylinder of the damper and the spring plate to change the vertical position of the spring and to adjust the height of the body of the vehicle from the ground.

The adjustment devices used to this end may be of various kinds, including hydraulic, pneumatic, hydro-pneumatic and electro-mechanical devices. The latter ones are gaining more and more attention and interest by virtue of their high reliability, their relatively low cost and their small size.

More specifically, the present invention relates to a damper and spring unit for a vehicle suspension using an electro-mechanical adjustment device, wherein the adjustment device comprises an electric motor that generates a rotary motion and a screw and nut motion conversion mechanism that converts the rotary motion generated by the electric motor into a translation motion of the spring plate, said motion conversion mechanism comprising one single screw driven into rotation about its own axis by the electric motor and one single nut that meshes with the screw and is drivingly connected for translation to the spring plate, whereby, upon operation of the electric motor, the rotary motion transmitted by the electric motor to the screw is converted into a translation motion of the nut, and of the spring plate therewith.

Examples of damper and spring units for a vehicle suspension of the type described above are known from U.S. Pat. Nos. 7,922,181, 8,205,864 and 8,833,775.

Furthermore, EP 2 332 756 discloses a damper and spring unit for a vehicle suspension provided with an electro-mechanical height adjustment device, wherein the adjustment device comprises at least three pairs of screws and nuts, each pair extending along an axis that extends parallel to the axis of the damper and is spaced apart from the latter.

Clearly, the above solution is rather complicated and expensive besides being particularly bulky, especially in the radial direction.

SUMMARY OF THE INVENTION

It is an object of the present invention to provide an improved damper and spring unit for a vehicle suspension, able to avoid rotation of the spring plate relative to the damper, without using dedicated anti-rotation members, simple and inexpensive to manufacture, and having a small size, especially in the radial direction.

A further object of the present invention is to provide a damper and spring unit for a vehicle suspension that may be designed, at least at a first stage, independently of the external size of the body of the damper.

These and other objectives are fully achieved according to the present invention by the damper and spring unit for a vehicle suspension described in greater detail in the following description of the invention.

In summary, the present invention is based on the idea of providing a damper and spring unit for a vehicle suspension, wherein the screw and the nut of the motion conversion mechanism of the adjustment device are arranged eccentrically with respect to the axis of the damper, so that the axis of the screw and of the nut is not coaxial with the axis of the damper, but extends at a certain distance therefrom. Such an arrangement of the screw and of the nut with respect to the damper and the spring plate intrinsically prevents the spring plate from rotating relative to the damper and, therefore, provides the required anti-rotation function, without using dedicated anti-rotation members, which usually negatively affect suspension performance. Furthermore, as the screw and the nut are arranged eccentrically with respect to the axis of the damper, their sizing does not depend, at least at a first stage, on the external size of the body of the damper and, therefore, a same sizing of the screw and the nut may be applied to several solutions having different external diameters of the body of the damper.

According to the present invention, the adjustment device further comprises a guide sleeve which is arranged around the cylinder of the damper so as to be slidable along the axis of the damper, is rigidly connected to the spring plate and works as a guide for a support arm that carries the nut or the screw of the motion conversion mechanism. Said guide sleeve permits use of a single screw and nut pair arranged eccentrically with respect to the axis of the damper, ensuring, at the same time, an adequate support of the vertical and transverse loads.

BRIEF DESCRIPTION OF THE DRAWINGS

Further features and advantages of the present invention will become apparent from the following detailed description, given purely by way of non-limiting example with reference to the appended drawings, wherein.

DETAILED DESCRIPTION OF THE INVENTION

Figure 1:
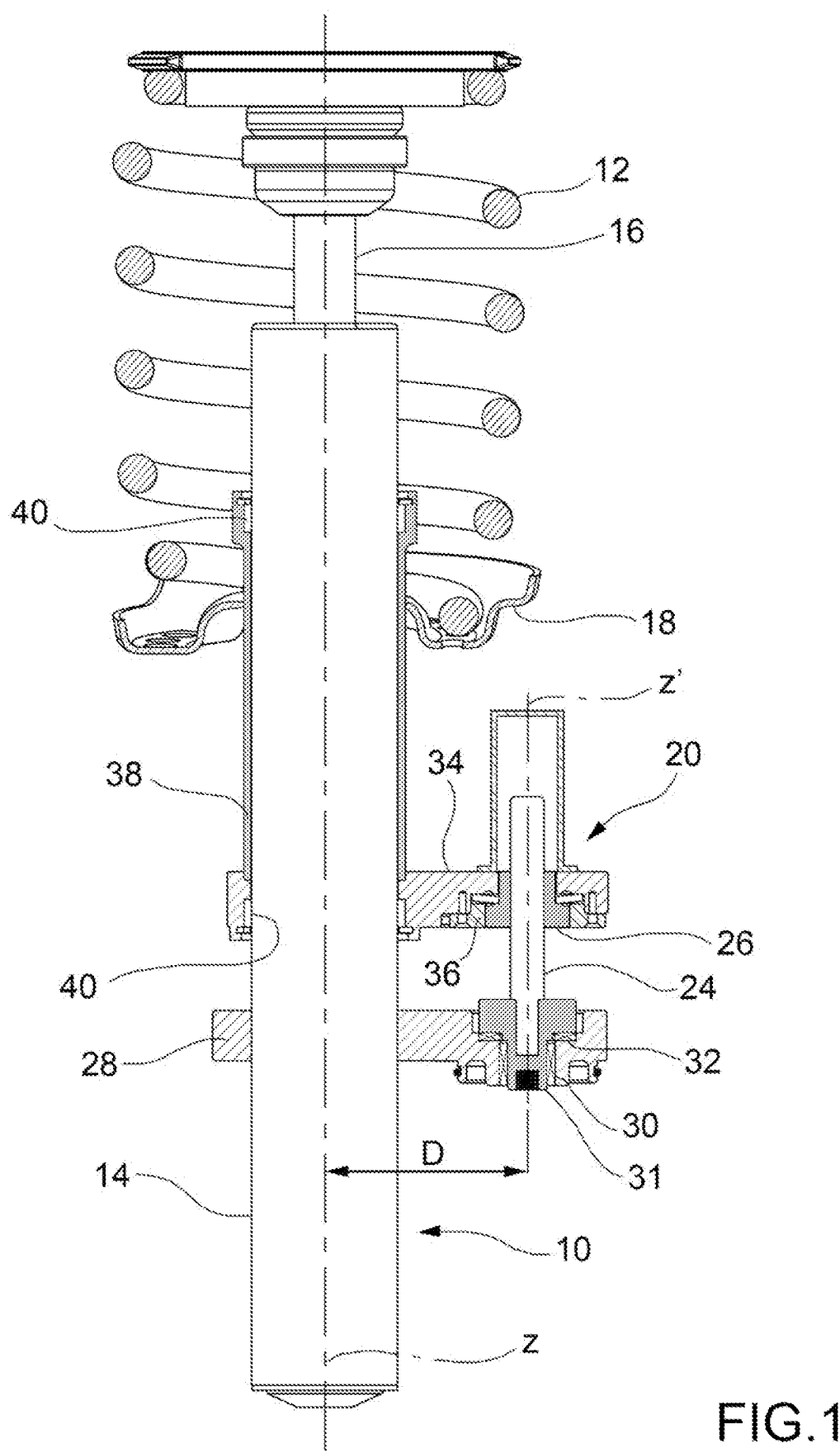
FIG. 1 is an axial section view of a damper and spring unit for a vehicle suspension according to an embodiment of the present invention.

In the following description and claims, terms like "upper" and "lower", "vertical" and "horizontal" are to be intended as referring to the mounted condition of the damper and spring unit on a vehicle.

With reference to the drawings, a damper and spring unit for a vehicle suspension comprises a damper 10 and a spring 12. Both the damper and the spring are well-known components and, therefore, will not be described or illustrated in detail. Only elements and parts of components, in particular of the damper, which are useful for a full understanding of the present invention will be described herein.

The damper 10 comprises a cylinder 14 connected to a wheel-carrying member (not shown) or to a suspension arm (not shown), and a piston (not shown) slidable inside the cylinder 14 and having a rod 16 that protrudes from the top end of the cylinder 14 and extends coaxially therewith. Both the cylinder 14 and the piston with its rod 16 are components of per-se-known type. The axis of the cylinder 14 is indicated with z and coincides with the direction of the extension and retraction movement of the rod 16 relative to the cylinder 14. The axis z is typically directed vertically or slightly inclined to the vertical direction. The rod 16 is fixed at its top end to the body of the vehicle (not shown).

The spring 12 is made as a cylindrical coil spring and rests at its bottom on a spring plate 18 arranged around the cylinder 14 of the damper 10.

The damper and spring unit further comprises an electromechanical adjustment device, indicated with 20, that adjusts in a controlled manner the vertical position of the spring plate 18 relative to the cylinder 14 of the damper 10, and therefore the vertical position of the bottom end of the spring 12. The adjustment device 20 is interposed between the cylinder 14 of the damper 10 and the spring plate 18 to allow adjustment of the position of the bottom end of the spring 12 relative to the cylinder 14 along the axis z and, therefore, of the vertical position of the bottom end of the spring 12, in order to change the height of the vehicle body from the ground or to keep the height of the vehicle body from the ground constant, compensating for height changes due to vehicle load changes.

Figure 2:
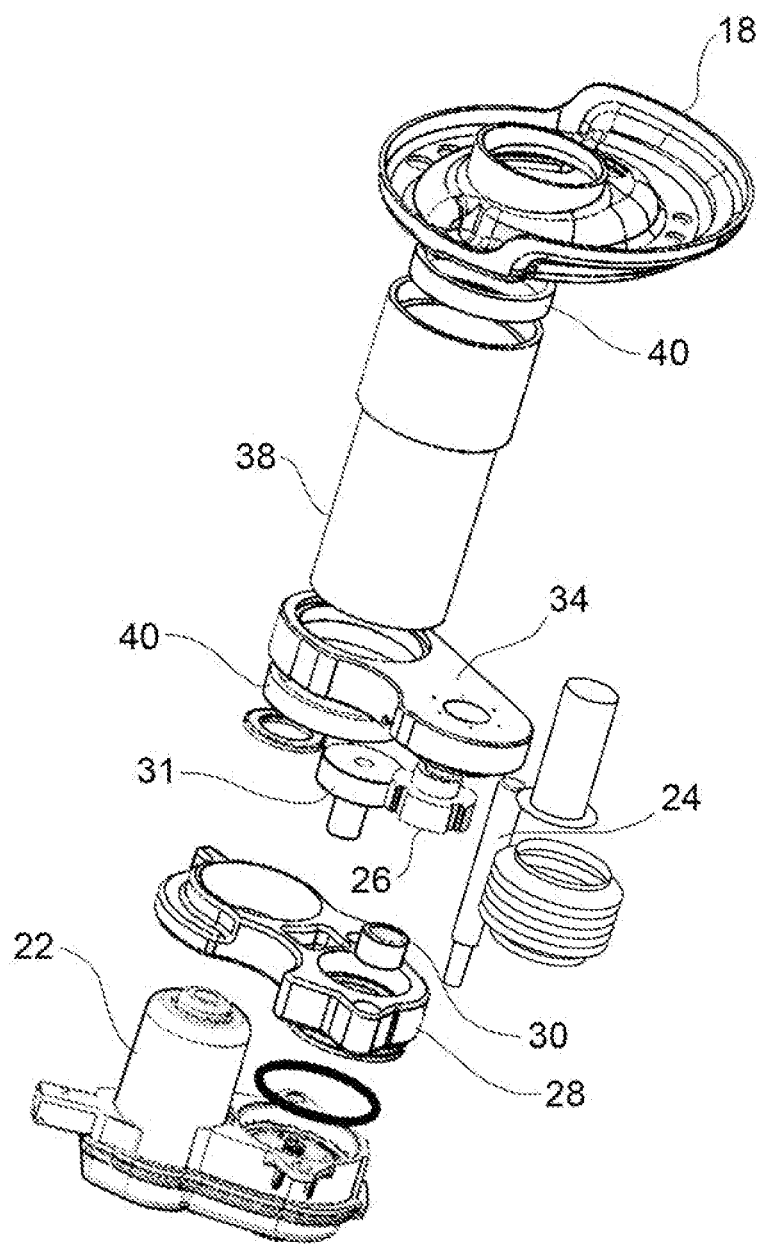
FIG. 2 is an exploded view of the adjustment device of the damper and spring unit of FIG. 1.

The adjustment device 20 comprises an electric motor 22 (shown only in FIG. 2) that generates a rotary motion, and a screw and nut motion conversion mechanism that converts the rotary motion generated by the electric motor 22 into a translation motion of the spring plate 18, said motion conversion mechanism comprising a screw 24 and a nut 26 engaging with the screw 24. In the illustrated embodiment, the screw 24 is driven into rotation about its own axis of rotation (indicated with z' in FIG. 1 and extending parallel to the axis z of the cylinder 14) by the electric motor 22, while the nut 26 is drivingly connected for translation to the spring plate 18, whereby upon operation of the electric motor 22 the rotary motion transmitted by the electric motor 22 to the screw 24 is converted into a translation motion of the nut 26, and of the spring plate 18 therewith.

Alternatively, the nut, instead of the screw, may be driven by the electric motor, and the spring plate may be drivingly connected for translation to the screw, rather than to the nut.

The electric motor 22 is drivingly connected to the cylinder 14 of the damper 10. In particular, in the proposed embodiment the electric motor 22 is carried by a lower support arm 28 which is in turn fixed, for example by welding, to the cylinder 14. As already said, the rotary motion generated by the electric motor 22 is transmitted—directly or indirectly—to the screw 24 of the motion conversion mechanism to drive rotation of the screw 24 about its own axis of rotation z'. Preferably, as in the proposed embodiment, a speed reducer mechanism (not shown, and of per-se-known type) is arranged between the electric motor 22 and the screw 24.

The screw 24 of the motion conversion mechanism is arranged with its axis of rotation z' parallel to the axis z of the cylinder 14 of the damper 10, but spaced by a given distance D (FIG. 1) therefrom. In other words, the screw 24 is arranged eccentrically to the cylinder 14, as well as to the spring 12 and the spring plate 18. In the proposed embodiment, the screw 24 is carried by an adapter 31, which is supported by the lower support arm 28 through a radial bearing 30, made for example as a friction bearing, and an axial bearing 32, made for example as a rolling bearing, in particular as a needle bearing. The adapter 31 receives the rotary motion from the electric motor 22 and is rigidly connected for rotation with the screw 24.

The nut 26 of the motion conversion mechanism is carried by an upper support arm 34 and is prevented by an anti-rotation member 36 from rotating relative to the latter. According to an embodiment, not shown herein, the nut 26 is made in one piece with the upper support arm 34 and, in this case, the nut is inherently prevented from rotating relative to the upper support arm, without requiring any additional anti-rotation member.

The spring plate 18 is rigidly connected to the upper support arm 34, in such a way that the spring plate 18 is able to move along the axis z of the cylinder 14 of the damper 10 together with the upper support arm 34, and, thus, together with the nut 26, when the screw 24 is driven into rotation about its axis of rotation z'.

The spring plate 18 is fixed, for example by welding, to the top end of a guide sleeve 38, which is coaxially arranged around the cylinder 14, and is slidable along the axis z relative to the cylinder 14, while the upper support arm 34 is fixed to the bottom end of the guide sleeve 38. The guide sleeve 38 and/or the upper support arm 34 are provided with anti-friction bushes 40 for reducing the sliding friction between the guide sleeve 38 and/or the upper support arm 34 and the cylinder 14, when the guide sleeve 38 and the upper support arm 34 move relative to the cylinder 14 along the axis z.

The adjustment device operates as follows.

The rotation of the electric motor 22 in either direction is transmitted to the screw 24, possibly via the speed reducer mechanism (if present), causing upward or downward translation of the nut 26 along the axis z' and, therefore, through the upper support arm 34, upward or downward translation of the guide sleeve 38 and of the spring plate 18 relative to the cylinder 14 of the damper 10 along the axis z. The vertical position of the bottom end of the spring 12 relative to the cylinder 14 is thus changed.

By appropriate design, the efficiency of the screw 24 and nut 26 pair may be brought to a sufficiently low value to make the mechanism irreversible. In this case, therefore, it is possible to keep the spring plate 18 fixed in any intermediate vertical position without applying any braking torque with the electric motor 22 and without using any additional devices for preventing rotation of the adjustment device, including friction mechanisms.

The adjustment device described above avoids use of anti-rotation members to prevent rotation of the spring plate relative to the cylinder of the damper, by virtue of the eccentric arrangement of the screw and the nut relative to the cylinder and the spring plate. In addition, the screw and nut motion conversion mechanism, by virtue of its irreversibility, avoids use of additional mechanisms for blocking the adjustment device in its position. Finally, the adjustment device may be easily installed, with very few modifications, on conventional damper and spring units, and sizing of the screw and nut motion conversion mechanism is independent of the external diameter of the cylinder of the damper.

The principle of the invention remaining unchanged, embodiments and constructional details may vary widely from those described and illustrated purely by way of non-limiting example, without thereby departing from the scope of the invention as described and claimed herein.

The invention claimed is:

1. A damper and spring unit for a vehicle suspension, comprising:
    a damper having a cylinder and a rod which extend along a first axis (z),
    a spring plate which is arranged around the cylinder of the damper and is slidable relative to the cylinder along said first axis (z),
    a spring having a bottom end resting on the spring plate, and
    an electro-mechanical adjustment device interposed between the cylinder of the damper and the spring plate to change, in a continuous and controlled manner, a vertical position of the bottom end of the spring, thereby allowing to adjust a height of a vehicle from the ground,
    wherein the electro-mechanical adjustment device comprises an electric motor that generates a rotary motion and a screw and nut motion conversion mechanism that converts the rotary motion generated by the electric motor into a translation motion of the spring plate,
    wherein said screw and nut motion conversion mechanism comprises a single screw extending along a second axis (z') parallel to, and spaced from, said first axis (z), and a single nut meshing with the screw,
    wherein the screw or the nut, is driven into rotation by the electric motor about said second axis (z'), while the nut, or the screw, respectively, is drivingly connected for translation to the spring plate, whereby upon operation of the electric motor the rotary motion transmitted by the electric motor to the screw, or to the nut, is converted into a translation motion of the nut, or of the screw, respectively, along said second axis (z'), and into a translation motion of the spring plate relative to the cylinder of the damper along said first axis (z), and
    wherein the electro-mechanical adjustment device further comprises a first support arm which carries the electric motor and the screw, or the nut, and is rigidly connected to the cylinder of the damper, a second support arm which carries the nut, or the screw, respectively, and is rigidly connected to the spring plate, and a guide sleeve which is rigidly connected on the one end to said second support arm and on the other end to the spring plate and is arranged around the cylinder of the damper so as to be slidable along said first axis (z).

2. The damper and spring unit as set forth in claim 1, wherein the electro-mechanical adjustment device further comprises a speed reducer mechanism interposed between the electric motor and the screw, or the nut.

3. The damper and spring unit as set forth in claim 1, wherein the screw and the nut form an irreversible motion conversion mechanism.

* * * * *